United States Patent [19]

Knappe et al.

[11] Patent Number: 5,485,514
[45] Date of Patent: Jan. 16, 1996

[54] TELEPHONE INSTRUMENT AND METHOD FOR ALTERING AUDIBLE CHARACTERISTICS

[75] Inventors: Michael E. Knappe, Ottawa; Brian R. Shelton, Kanata, both of Canada

[73] Assignee: Northern Telecom Limited, Montreal, Canada

[21] Appl. No.: 220,653

[22] Filed: Mar. 31, 1994

[51] Int. Cl.⁶ ................................................ H04M 11/00
[52] U.S. Cl. .......................... 379/387; 379/430; 379/61; 381/63; 381/183
[58] Field of Search ..................... 379/387, 430, 379/61, 368; 381/63, 187, 183, 68, 68.1, 103

[56] References Cited

U.S. PATENT DOCUMENTS

| | | | |
|---|---|---|---|
| 4,338,581 | 7/1982 | Morgan | 333/165 |
| 4,694,497 | 9/1987 | Kasai et al. | 381/63 |
| 4,731,848 | 3/1988 | Kendall et al. | 381/63 |
| 4,953,219 | 8/1990 | Kasai et al. | 381/86 |
| 5,086,464 | 2/1992 | Groppe | 379/430 |
| 5,113,428 | 5/1992 | Fitzgerald | 379/430 |
| 5,146,507 | 9/1992 | Satoh et al. | 381/63 |
| 5,381,486 | 1/1995 | Ludeke et al. | 379/430 |

OTHER PUBLICATIONS

Schroeder, M. R., Natural Sounding Artificial Reverberation, Journal of the Audio Engineering Society, Jul. 1962, vol. 10, No. 3, pp. 219–223.

*Primary Examiner*—Jeffery Hofsass
*Assistant Examiner*—Jacques M. Saint-Surin
*Attorney, Agent, or Firm*—J. E. Moorhouse

[57] ABSTRACT

A telephone instrument creates spatially simulated sound signals from signals received from a telephone line. The received signals are directed to left and right channels. In each channel, the signals are processed via a direct path, an early reflection path including a finite impulse response filter and a reverberant decay path including all-pass filter. In each channel, the outputs from the three paths are summed with different weights.

1 Claim, 4 Drawing Sheets

TELEPHONE INSTRUMENT AND METHOD FOR ALTERING AUDIBLE CHARACTERISTICS

TECHNICAL FIELD

The present invention relates to a telephone instrument and method for altering audible characteristics and in particular, to spatially simulated signals generated from signals from a telephone line.

BACKGROUND ART

A telephone instrument usually includes a microphone which functions as a transmitter and an earphone which functions as a receiver. The transmitter and the receiver are coupled to a telephone line by an interface. In an analog telephone set, for example, the interface performs a hybrid function which includes directing signals from the transmitter to the telephone line and directing signals from the telephone line to the receiver.

A telephone operator or attendant may use a headset which includes a microphone and a single earphone or a pair of earphones for left and right ears. At present, there is little advantage to using a pair of earphones as the signals on the telephone line lack binaural information. Hence, the telephone user must listen to sounds which lack the quality of sound in a normal listening environment.

U.S. Pat. No. 4,694,497 granted to Junichi Kasai et al on Sep. 15, 1987 and U.S. Pat. No. 4,953,219 granted to Junichi Kasai et al on Aug. 28, 1990 disclose reproduction of stereophonic sound signals adapted to multiple speakers from a stereo sound signal. This, however, is not applicable to reproduction of sounds characteristic of a normal listening environment from monaural sound signals.

U.S. Pat. No. 4,338,581 granted to Nelson H. Morgan on Jul. 6, 1982 discloses room sound simulation. M. R. Schroeder teaches artificial reverberation in the Journal of the Audio Engineering Society, Vol.10, Number 3, pp. 219–223 (July 1962). Neither, however, suggests reproduction of sounds characteristic of a normal listening environment from monaural sound signals.

SUMMARY OF THE INVENTION

It is an object of the present invention to provide a telephone instrument and method for altering a voice signal received from a telephone line to simulate a characteristic of spatial presence.

According to one aspect of the present invention, there is provided a telephone instrument for receiving signals from and for transmitting signals to another telephone instrument via a telephone line, the telephone instrument comprising: transmitter means; a pair of receiver means for use in acoustical association with the left and right ears of a user of the telephone instrument; signal coupling means including signal transmitting means and signal receiving means, the signal transmitting means transmitting signals from the transmitter means to the telephone line and coupling the received signals; and a pair of received signal processing means, each receiving the respective received signal $X(i)$, each received signal processing means including direct path processing means, finite impulse processing means, all-pass signal means and signal summing means.

The direct path processing means processes the received signal $X(i)$ and provides a direct path output signal which is proportional to the received signal $X(i)$; the finite impulse processing means processes the received signal $X(i)$ and provides a finite impulse output signal which is proportional to $\Sigma C(k) X(i-k)$; the all-pass signal means processes the finite impulse output signal and provides an all-pass output signal which is proportional to $\beta(i-M)$, where $\beta(i)=(-g)\cdot X(i)+(1-g^2)\cdot \alpha(i-N)$, and $\alpha(i)=X(i)+g\cdot \alpha(i-N)$, wherein, $C(k)$ represents a sequence of finite impulse response coefficients, g is a gain coefficient, and M and N represent delay coefficients.

The signal summing means sums the direct path output signal, the finite impulse output signal and the all-pass output signal and provides a summed signal for operation of the respective one of the pair of receiver means.

The telephone instrument further comprises means for differentiating the coefficients in one of the pair of received signal processing means from those of the other received signal processing means.

By the telephone instrument, an audible phase characteristic of the summed signal provided by each received signal processing means is altered from the received signal $X(i)$, so that signals audible at one of the pair of the receiver means are at variance with signals audible at the other of the pair of the receiver means.

According to another aspect of the present invention, there is provided a method for providing telephony communications with a telephone user, comprising the steps of: coupling signals of the user's origin from a transmitter means to a telephone line; processing each of the received signal $X(i)$ with direct path processing means, finite impulse processing means, all-pass signal means and signal summing means, the direct path processing means providing a direct path output signal which is proportional to the received signal $X(i)$, the finite impulse processing means providing a finite impulse output signal which is proportional to $\Sigma C(k) X(i-k)$, the all-pass signal means providing an all-pass output signal which is proportional to $\beta(i-M)$, the signal summing means providing a summed signal of the direct path output signal, the finite impulse output signal and the all-pass output signal for operation of the respective one of the pair of receiver means, where $\beta(i)=(-g)\cdot X(i)+(1-g^2)\cdot \alpha(i-N)$, and $\alpha(i)=X(i)+g\cdot \alpha(i-N)$, wherein, $C(k)$ represents a sequence of finite impulse response coefficients, g is a gain coefficient, and M and N represent delay coefficients; and changing the coefficients G1, G2, G3, g, M and N and finite impulse response coefficients between the received signal processing means.

By the method, an audible phase characteristic of the summed signal provided by each received signal processing means is altered from the received signal $X(i)$, so that signals audible at one of the pair of the receiver means are at variance with signals audible at the other of the pair of the receiver means.

In the present invention, there are three signal processing paths in each channel: a direct path, a finite impulse processing path and an all-pass signal processing path. The outputs from the three paths are summed in each channel with different weights. The resultant sounds provide a perceivable spatial quality for the listener.

In an example of the present invention, the signals coupled to both receiver means are at variance in phase, so that the telephone user perceives a spatial orientation, as if the other party to the telephone communication were actually somewhere nearby.

BRIEF DESCRIPTION OF THE DRAWINGS

An embodiment of the present invention will now be described by way of example with reference to the accompanying drawings in which.

DETAILED DESCRIPTION OF THE EMBODIMENT

Figure 1:
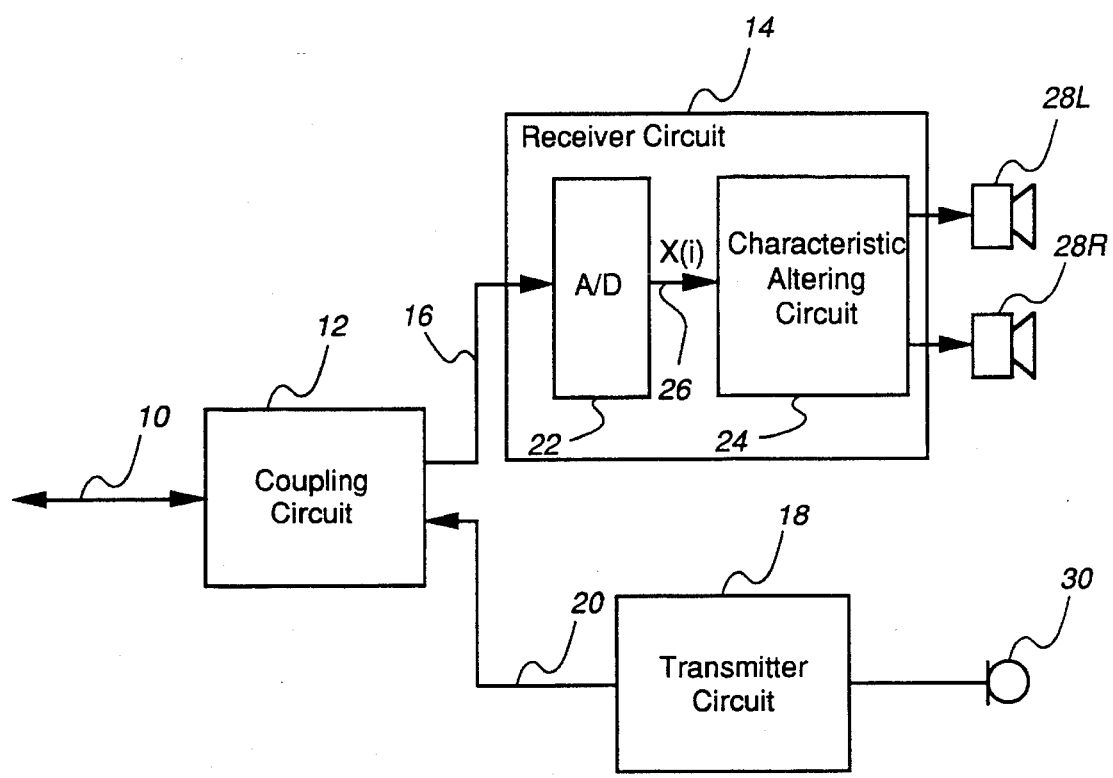
FIG. 1 is a block diagram of a telephone instrument according to the present invention.

Referring to FIG. 1, the telephone instrument is connected to a telephone line 10 which is connected to a switching facility, for example, a central office or PBX (not shown). The telephone instrument has a coupling circuit 12 which is connected to a receiver circuit 14 via a receiver line 16 and to a transmitter circuit 18 via a transmitter line 20. The receiver circuit 14 has an analog-digital (A/D) converter 22 which is connected to the receiver line 16 and a characteristic altering circuit 24 which is connected to the A/D converter 22 via a digital signal line 26. The characteristic altering circuit 24 is connected to a pair of left and right earphones 28L and 28R, in one example, a telephone operator's headset. A microphone 30 is connected to the transmitter circuit 18. As is conventional, the coupling circuit 12 performs a hybrid circuit function which includes receiving voice band signals from the telephone line 10 and transmitting voice band signals to the telephone line 10.

Figure 2:
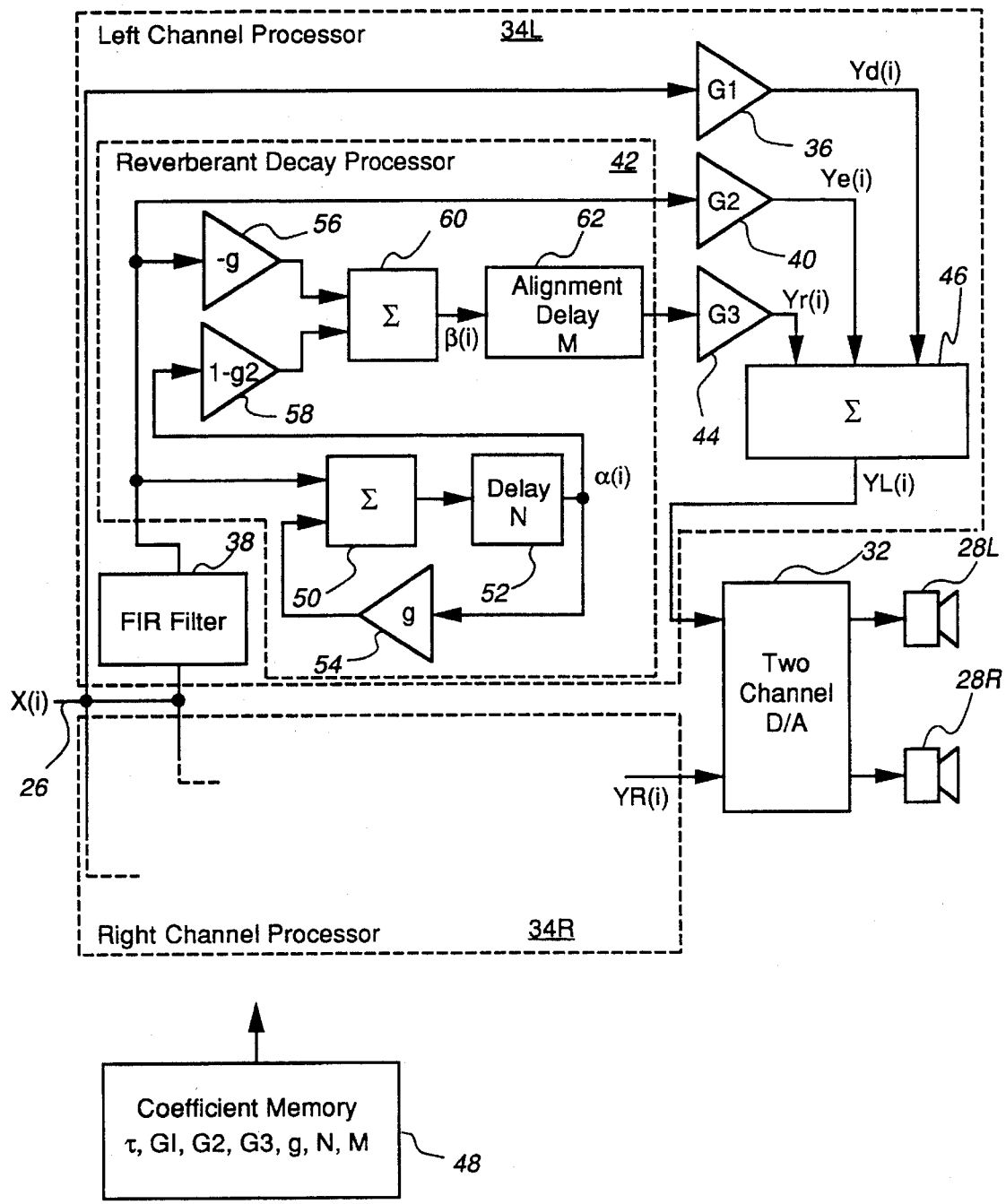
FIG. 2 is a block diagram illustrating an example of the characteristic altering circuit shown in FIG. 1.

Referring to FIG. 2, the characteristic altering circuit 24 has a two channel digital-analog (D/A) converter 32 which is connected to the left and right earphones 28L and 28R. The characteristic altering circuit 24 has a left channel processor 34L and a right channel processor 34R.

The left channel processor 34L processes signals on three paths of the left channel: a direct path, an early reflect path, and a reverberation path. The direct path is formed by an amplifier 36 which has a direct path gain coefficient G1. The early reflect path is formed by a series-connected finite impulse response (FIR) filter 38 and an amplifier 40 which has an early reflection path gain coefficient G2. The reverberation path is formed by the FIR filter 38, a reverberant decay processor 42, and an amplifier 44 which has a reverberation path gain coefficient G3. The outputs of the three paths are connected to a summer 46 which is connected to the two channel D/A converter 32. The FIR filter 38 is a 420-tap FIR filter which has filter coefficients $\tau_1 - \tau_{400}$. The coefficients $\tau_1 - \tau_{400}$ correspond to the 0–50 ms segment of a measured room impulse response which is sampled at 8 kHz.

The right channel processor 34R has the same structure as the left channel processor 34L and a detailed circuit is not shown.

The telephone instrument has a coefficient memory 48 which stores a plurality of sets of coefficient parameters: i.e., the FIR filter coefficients $\tau_1 - \tau_{400}$, the gain coefficients G1, G2, and G3, and delay coefficients M and N. The coefficient memory 48 is a volatile memory such as an SRAM and EPROM.

The reverberant decay processor 42 is well known; e.g., M. R. Schroeder teaches such a processor in the Journal of the Audio Engineering Society, Vol. 10, p. 219 (July 1962). The reverberant decay processor 42 consists of a summation element 50, a delay element 52, amplifying elements 54, 56, and 58, a summation element 60 and an alignment delay element 62. The amplifying elements 54, 56, and 58 have gain coefficients g, -g, and $1-g^2$, respectively. The delay elements 52 and 62 delay the sample signals by N and M samples, respectively.

The reverberant decay processor 42 may be formed by a digital signal processor, e.g., Motorola DSP56156-60. One set of the amplifiers 36, 40, and 44 may be formed by an operational amplifier, e.g., Signetics NE5532A. The A/D converter 22 and the two channel D/A converter 32 may be formed by a multimedia audio codec, e.g., Crystal Semiconductor CS4415.

The telephone instrument shown in FIGS. 1 and 2 receives signals from the telephone line 10 and creates two different signals which are directed to the left and right earphones 28L and 28R. The resultant sound is perceived by the user to have a quality of spatial presence. This is a pleasant improvement as compared to the effect of a simple binaural headset as typically used to receive signals directly from the telephone line.

Figure 3:
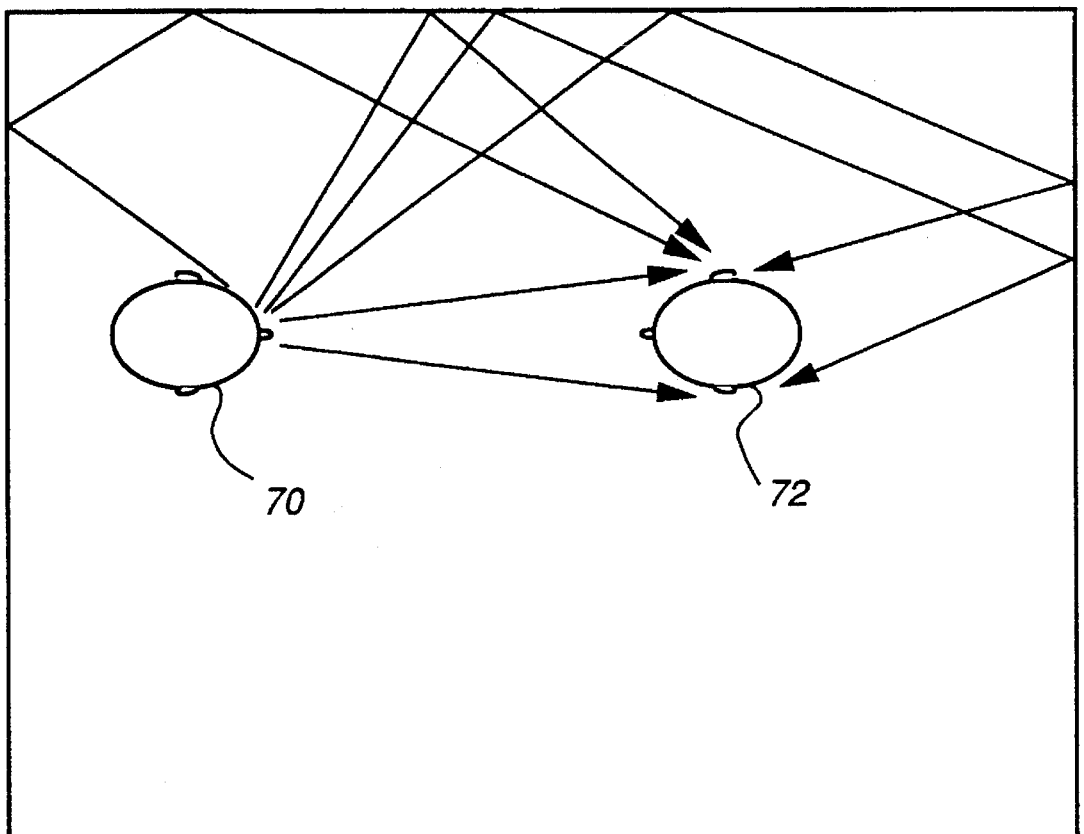
FIG. 3 illustrates a typical talking and listening environment.

To understand the spatial simulation, a simulated listening environment is described referring to FIG. 3. In this model, a talker 70 is located in front of a listener 72 in an acoustically pleasant environment. The voice sounds from the talker 70 arrive at the ears of the listener 72 via many paths: a direct path and wall reflection paths.

Figure 4:
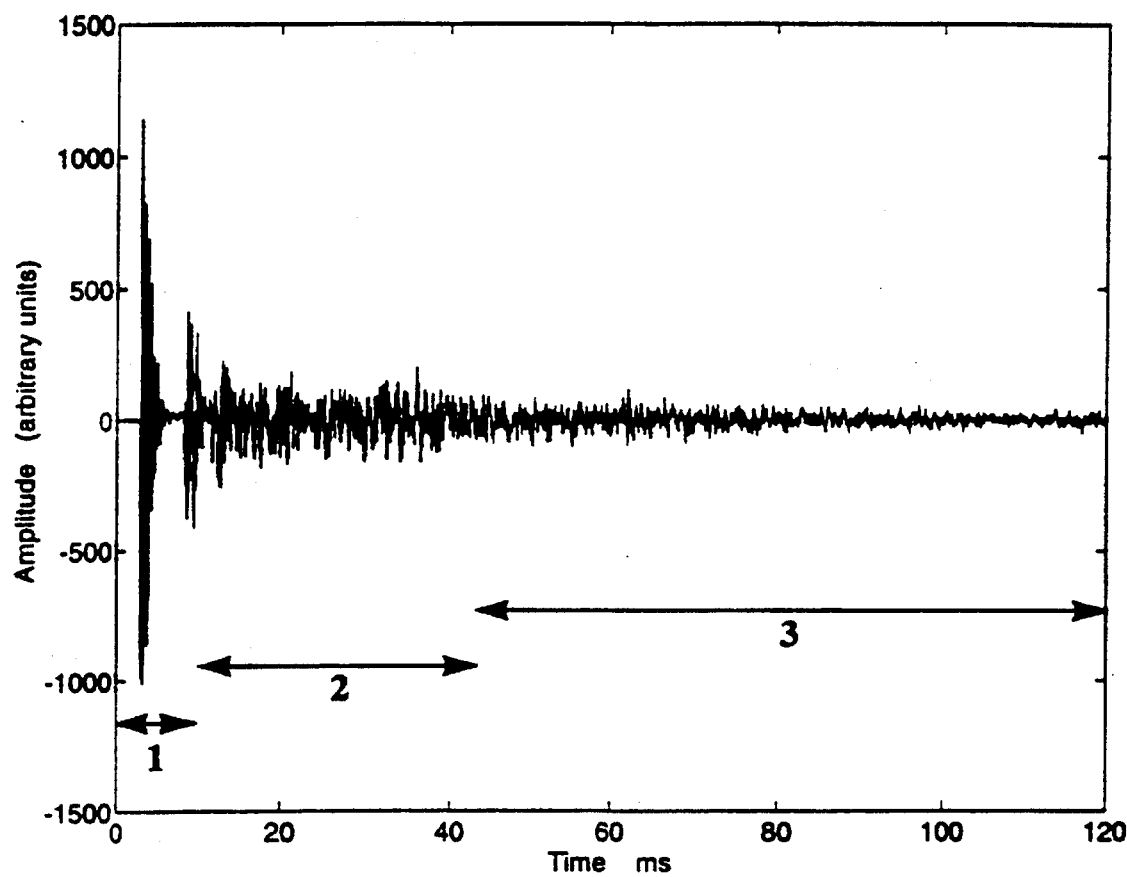
FIG. 4 shows an example of a measured impulse response between a listener's ear and a sound source (a talker) in front of the listener in an acoustically "pleasant" listening environment.

FIG. 4 shows a measurement of the impulse response of an acoustic transmission path to a single ear in a pleasant listening environment. The impulse response may be considered to have three major components in time: (1) direct transmission components, (2) early reflection transmission components, and (3) random transmission components. The direct transmission components are the sounds which arrive by the shortest (i.e., direct) transmission path during a time period of 0–9 ms. The early reflection transmission components are the sounds which arrives after reflection from nearby wall surfaces and objects in the room during a time period of 10–50 ms. The random transmission components are the sounds which arrive after essentially random reflection after a time of 50 ms and the amplitudes of the components are exponentially decaying. The three components may be called the direct sound, the early reflection sound, and the reverberant decay sound. These components are different as perceived at the left and right ear of a listener and provide indication to the listener as to the relative physical location of the source of the sound.

Figure 5:
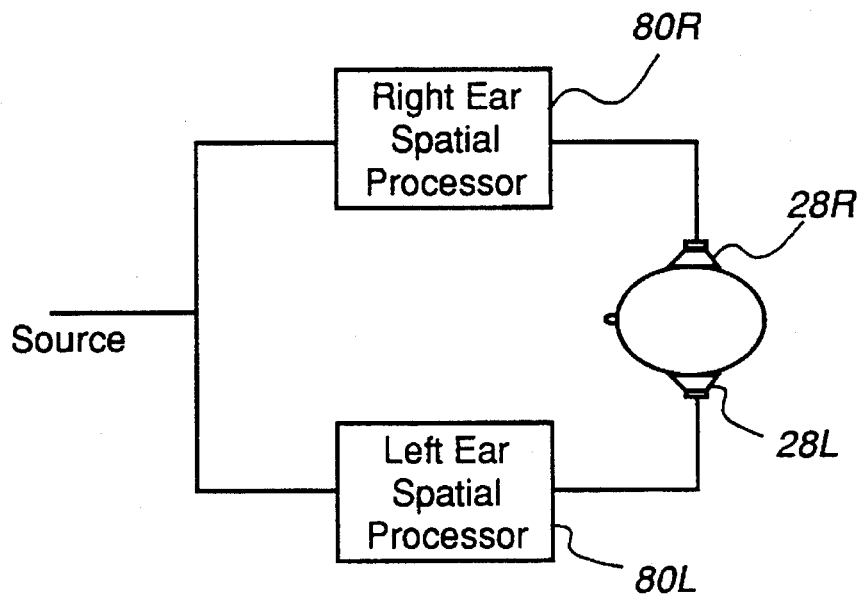
FIG. 5 shows spatial processing as applied to a telephone voice signal for simulating the "pleasant" listening environment.

FIG. 5 shows spatial processing as re-creation of real listening environment. There are a pair of left and right ear spatial processors 80L and 80R for a pair of the left and right earphones 28L and 28R. The spatial processors 80L and 80R are formed by the characteristic altering circuit 24 shown in FIGS. 1 and 2.

The telephone instrument shown in FIGS. 1 and 2 obtains spatial simulation similar in quality to more computationally intensive methods by modelling the three basic components of the room impulse response. The direct sound is represented by an unprocessed audio signal. The early reflection sound is represented by the signal through an FIR filter during a time period of about 50 ms. The reverberant decay sound is represented by the signal through an all-pass filter and a delay line after the s early reflection. The three sounds are then summed together, with different weights.

Operation of the telephone instrument shown in FIGS. 1 and 2 is now described. The FIR filter coefficients $\tau_1$–$\tau_{400}$, the gain coefficients G1, G2, G3, and g, and delay coefficients M and N, are supplied as variable parameters by the coefficient memory 48 to the respective FIR filters, amplifiers, amplifying elements, and delay elements of the characteristic altering circuit 24.

In this embodiment, the parameters of coefficients of the left channel are different from that of the right channel to create the spatial impression for the listener. Examples of the FIR filter coefficients $\tau_1$–$\tau_{400}$ are listed in the attached Table I. Examples of other parameters are as follows:

| Parameter | Left Channel | Right Channel |
|---|---|---|
| G1 | 0.20 | 0.22 |
| G2 | 0.74 | 0.73 |
| G3 | 0.06 | 0.05 |
| g | 0.56 | 0.52 |
| N | 104 | 112 |
| M | 453 | 417 |

The coupling circuit 12 provides the receiver line 16 with received analog voice band signals which in turn are converted to digital signals by the A/D converter 22. The A/D converter 22 samples the analog signals at an 8 kHz rate and quantizes the samples linearly in a digitally coded format. The digital signal samples X(i) are provided on the digital signal line 26. The samples X(i) are altered by the characteristic altering circuit 24 to provide signals for the left and right earphones 28L and 28R. In each channel processor, the sample X(i) is processed via the three paths: the direct path, the early reflect path and the reverberation path.

In the direct path, the samples X(i) are simply multiplied by the amplifier 36. The output Yd(i) of the direct path is given by:

$$Yd(i) = G1 \cdot X(i)$$

In the early reflection path, the samples X(i) are filtered by the FIR filter 38 having 420 taps of the coefficients $\tau_1$–$\tau_{400}$. The output sample is then multiplied by the amplifier 40. The output Ye(i) of the early reflections path is given by:

$$Ye(i) = G2 \times \left( \sum_{k=1}^{400} C(k) X(i-k) \right)$$

where C(k) represents a sequence of FIR filter coefficients $\tau_1$–$\tau_{400}$.

In the reverberant path, the output sample is processed by the reverberant decay processor 42, the output of which is an exponentially decreasing scaled, delayed version of past input samples. The current output sample of the FIR filter 38 is delayed by the delay element 52 and the alignment delay element 62 by N and M samples relative to the direct sound. The delayed output of the reverberant decay processor 42 is multiplied by the amplifier 44. The output Yr(i) of the reverberant decay path is:

$$Yr(i) = G3 \cdot \beta(i-M)$$

where $$\beta(i) = (-g) \cdot X(i) + (1-g^2) \cdot \alpha(i-N)$$

where $$\alpha(i) = X(i) + g \cdot \alpha(i-N)$$

The three path outputs are summed by the summer 46. The output sample YL(i) or YR(i) of the left or right channel is given by:

$$YL(i) \text{ or } YR(i) = Yd(i) + Ye(i) + Yr(i)$$

The output samples YL(i) and YR(i) are separately converted to analog signals by the two channel D/A converter 32. The converted left and right signals are supplied to the left and right earphones 28L and 28R of the headset. The telephone operator or attendant is provided with spatially simulated signals as could be normal in an acoustically pleasant environment.

In one example, the coefficient parameters are altered from one telephone call to another to provide some variation in the spatial presence conveyed to the telephone operator or attendant. The coefficient memory 48 can be provided with two or more sets of coefficients for this purpose.

TABLE I

| Coefficient Number | Left Channel FIR | Right Channel FIR |
|---|---|---|
| 1 | 0.00E + 00 | 0.00E + 00 |
| 2 | 0.00E + 00 | 0.00E + 00 |
| 3 | 0.00E + 00 | 0.00E + 00 |
| 4 | 0.00E + 00 | 0.00E + 00 |
| 5 | 0.00E + 00 | 0.00E + 00 |
| 6 | 0.00E + 00 | 0.00E + 00 |
| 7 | 0.00E + 00 | 0.00E + 00 |
| 8 | 0.00E + 00 | 0.00E + 00 |
| 9 | 0.00E + 00 | 0.00E + 00 |
| 10 | 0.00E + 00 | 0.00E + 00 |
| 11 | 0.00E + 00 | 0.00E + 00 |
| 12 | 0.00E + 00 | 0.00E + 00 |
| 13 | 0.00E + 00 | 0.00E + 00 |
| 14 | 0.00E + 00 | 0.00E + 00 |
| 15 | 0.00E + 00 | 0.00E + 00 |
| 16 | 0.00E + 00 | 0.00E + 00 |
| 17 | 0.00E + 00 | 0.00E + 00 |
| 18 | 0.00E + 00 | 0.00E + 00 |
| 19 | 0.00E + 00 | 0.00E + 00 |
| 20 | 0.00E + 00 | 0.00E + 00 |
| 21 | 0.00E + 00 | 0.00E + 00 |
| 22 | 0.00E + 00 | 1.93E + 03 |
| 23 | 0.00E + 00 | −3.82E + 03 |
| 24 | 3.14E + 03 | 6.01E + 03 |
| 25 | −4.74E + 03 | −1.66E + 04 |
| 26 | −2.21E + 04 | −9.48E + 03 |
| 27 | 1.30E + 04 | 1.68E + 04 |
| 28 | 1.16E + 04 | 5.96E + 03 |
| 29 | 3.93E + 03 | 3.81E + 03 |
| 30 | 4.08E + 02 | −1.84E + 03 |
| 31 | −9.15E + 02 | 5.55E + 02 |
| 32 | −6.10E + 01 | −1.25E + 03 |
| 33 | −3.59E + 02 | 1.37E + 03 |
| 34 | 1.83E + 03 | 4.57E + 02 |
| 35 | −1.26E + 02 | 1.07E + 03 |
| 36 | 1.92E + 03 | 9.75E + 02 |
| 37 | −6.74E + 02 | 0.00E + 00 |
| 38 | 1.55E + 03 | 5.33E + 02 |
| 39 | −1.13E + 03 | −5.02E + 02 |
| 40 | −1.76E + 02 | 3.09E + 02 |

TABLE I-continued

| Coefficient Number | Left Channel FIR | Right Channel FIR |
|---|---|---|
| 41 | −1.54E + 03 | −2.59E + 02 |
| 42 | 1.40E + 01 | 8.99E + 02 |
| 43 | 7.60E + 02 | −1.14E + 03 |
| 44 | −9.00E + 00 | −2.22E + 02 |
| 45 | 2.21E + 02 | −1.94E + 03 |
| 46 | −8.85E + 02 | −1.24E + 03 |
| 47 | −3.77E + 02 | −2.99E + 02 |
| 48 | −5.45E + 02 | −1.69E + 02 |
| 49 | −1.59E + 03 | −1.62E + 02 |
| 50 | −1.11E + 03 | 3.60E + 01 |
| 51 | 1.68E + 02 | −3.42E + 02 |
| 52 | −9.82E + 02 | −2.27E + 02 |
| 53 | 5.41E + 02 | −3.26E + 02 |
| 54 | −1.35E + 03 | 3.00E + 00 |
| 55 | −1.54E + 03 | −3.68E + 02 |
| 56 | −4.87E + 02 | −1.24E + 03 |
| 57 | −1.12E + 03 | −1.08E + 03 |
| 58 | 8.61E + 02 | 3.73E + 02 |
| 59 | 2.30E + 03 | 1.22E + 03 |
| 60 | 1.20E + 01 | −1.14E + 03 |
| 61 | 1.12E + 03 | 2.28E + 03 |
| 62 | 7.46E + 02 | −1.26E + 02 |
| 63 | 1.81E + 02 | 3.48E + 02 |
| 64 | 1.02E + 03 | −1.40E + 03 |
| 65 | −1.03E + 03 | −2.00E + 03 |
| 66 | 2.30E + 01 | 3.74E + 03 |
| 67 | 2.74E + 02 | 4.36E + 02 |
| 68 | 7.73E + 02 | 3.09E + 02 |
| 69 | −1.42E + 03 | 4.12E + 02 |
| 70 | −3.50E + 01 | −4.74E + 02 |
| 71 | 1.84E + 03 | −1.11E + 02 |
| 72 | −7.08E + 02 | −4.40E + 01 |
| 73 | −1.43E + 03 | −6.70E + 01 |
| 74 | −4.28E + 02 | 1.50E + 02 |
| 75 | 2.76E + 02 | −7.51E + 02 |
| 76 | 5.90E + 01 | −2.14E + 02 |
| 77 | 6.86E + 02 | −1.28E + 02 |
| 78 | −2.00E + 00 | −9.40E + 02 |
| 79 | −2.64E + 02 | 7.17E + 02 |
| 80 | −3.27E + 02 | 2.08E + 02 |
| 81 | 2.21E + 02 | −7.12E + 02 |
| 82 | 1.23E + 02 | 5.25E + 02 |
| 83 | 1.74E + 02 | 2.82E + 02 |
| 84 | −9.94E + 02 | 5.11E + 02 |
| 85 | 7.64E + 02 | 9.96E + 02 |
| 86 | 6.58E + 02 | −8.54E + 02 |
| 87 | −4.49E + 02 | 2.68E + 02 |
| 88 | −4.50E + 01 | −3.92E + 02 |
| 89 | −1.59E + 02 | −8.58E + 02 |
| 90 | −5.65E + 02 | 4.70E + 01 |
| 91 | −7.25E + 02 | −1.18E + 02 |
| 92 | 6.95E + 02 | 1.10E + 02 |
| 93 | −1.39E + 02 | 5.30E + 02 |
| 94 | 8.01E + 02 | 3.20E + 02 |
| 95 | −2.61E + 02 | 6.35E + 02 |
| 96 | 1.65E + 03 | 5.07E + 02 |
| 97 | −9.71E + 02 | −9.08E + 02 |
| 98 | −3.00E + 02 | 9.91E + 02 |
| 99 | 1.41E + 03 | 1.81E + 02 |
| 100 | −1.23E + 03 | −1.21E + 03 |
| 101 | −2.87E + 02 | −6.01E + 02 |
| 102 | −2.70E + 01 | −3.30E + 02 |
| 103 | 1.26E + 03 | 3.82E + 02 |
| 104 | 5.89E + 02 | 1.01E + 02 |
| 105 | −3.97E + 02 | −4.00E + 01 |
| 106 | −2.47E + 03 | −2.75E + 02 |
| 107 | −1.43E + 02 | −1.35E + 03 |
| 108 | −4.81E + 02 | 2.04E + 02 |
| 109 | 8.51E + 02 | 1.45E + 03 |
| 110 | 9.92E + 02 | 8.44E + 02 |
| 111 | −3.62E + 02 | 5.39E + 02 |
| 112 | 3.73E + 02 | −5.48E + 02 |
| 113 | −3.20E + 01 | 1.49E + 02 |
| 114 | 1.57E + 03 | 3.39E + 02 |
| 115 | 4.02E + 02 | 4.94E + 02 |
| 116 | 4.32E + 02 | 4.52E + 02 |
| 117 | −1.97E + 02 | 1.30E + 01 |
| 118 | 6.67E + 02 | −4.90E + 01 |
| 119 | −8.17E + 02 | 2.08E + 02 |
| 120 | −8.45E + 02 | 2.71E + 02 |
| 121 | 3.00E + 00 | −4.73E + 02 |
| 122 | −2.84E + 02 | −2.89E + 02 |
| 123 | −1.50E + 02 | −5.77E + 02 |
| 124 | 9.50E + 01 | −2.64E + 02 |
| 125 | 8.26E + 02 | 2.05E + 02 |
| 126 | −1.57E + 02 | −1.47E + 02 |
| 127 | 4.40E + 01 | 4.30E + 02 |
| 128 | −5.19E + 02 | 1.20E + 01 |
| 129 | −6.60E + 01 | −3.50E + 02 |
| 130 | −2.15E + 02 | 5.10E + 01 |
| 131 | 2.06E + 02 | −2.55E + 02 |
| 132 | −5.60E + 02 | 8.40E + 01 |
| 133 | 1.92E + 02 | −8.74E + 02 |
| 134 | −5.55E + 02 | 2.24E + 02 |
| 135 | 5.42E + 02 | 7.54E + 02 |
| 136 | −1.76E + 02 | −5.09E + 02 |
| 137 | −7.58E + 02 | 7.74E + 02 |
| 138 | 9.28E + 02 | 1.07E + 03 |
| 139 | −1.00E + 03 | 2.39E + 02 |
| 140 | 1.92E + 03 | 4.21E + 02 |
| 141 | −5.02E + 02 | −5.83E + 02 |
| 142 | 2.37E + 02 | −4.67E + 02 |
| 143 | 2.34E + 02 | 1.79E + 02 |
| 144 | −2.61E + 02 | −4.68E + 02 |
| 145 | 3.70E + 02 | 3.37E + 02 |
| 146 | −4.83E + 02 | 1.80E + 01 |
| 147 | 2.00E + 03 | 1.23E + 03 |
| 148 | 8.58E + 02 | 9.55E + 02 |
| 149 | −5.00E + 01 | −1.11E + 03 |
| 150 | −4.51E + 02 | −5.87E + 02 |
| 151 | 1.12E + 02 | −4.02E + 02 |
| 152 | −7.66E + 02 | −8.05E + 02 |
| 153 | 3.58E + 02 | 4.70E + 01 |
| 154 | 1.81E + 03 | −8.00E + 00 |
| 155 | −2.00E + 01 | 4.83E + 02 |
| 156 | −1.00E + 03 | 3.24E + 02 |
| 157 | −1.05E + 03 | −6.51E + 02 |
| 158 | 2.42E + 02 | 2.93E + 02 |
| 159 | 4.28E + 02 | −1.16E + 02 |
| 160 | −1.91E + 02 | −3.50E + 01 |
| 161 | −5.25E + 02 | −7.50E + 01 |
| 162 | −7.40E + 02 | 2.35E + 02 |
| 163 | .1.69E + 02 | 6.09E + 02 |
| 164 | −1.26E + 02 | 1.86E + 02 |
| 165 | 5.56E + 02 | −7.22E + 02 |
| 166 | 5.13E + 02 | −6.87E + 02 |
| 167 | −1.87E + 02 | 4.70E + 01 |
| 168 | −5.04E + 02 | 3.34E + 02 |
| 169 | 4.15E + 02 | 2.16E + 02 |
| 170 | 1.12E + 03 | −9.10E + 01 |
| 171 | −8.30E + 01 | 4.77E + 02 |
| 172 | −4.01E + 02 | 2.71E + 02 |
| 173 | −2.23E + 02 | −3.40E + 01 |
| 174 | 4.79E + 02 | 1.74E + 02 |
| 175 | −4.40E + 02 | 2.51E + 02 |
| 176 | −1.18E + 02 | −2.26E + 02 |
| 177 | 4.50E + 01 | 1.91E + 02 |
| 178 | 2.88E + 02 | −4.00E + 00 |
| 179 | 2.14E + 02 | 3.82E + 02 |
| 180 | −2.30E + 02 | 1.72E + 02 |
| 181 | −4.43E + 02 | −4.39E + 02 |
| 182 | 1.50E + 01 | −5.62E + 02 |
| 183 | −3.60E + 01 | −9.51E + 02 |
| 184 | −8.00E + 00 | 5.18E + 02 |
| 185 | −2.29E + 02 | 1.65E + 02 |
| 186 | −3.79E + 02 | −1.71E + 02 |
| 187 | 2.87E + 02 | −3.47E + 02 |
| 188 | 3.48E + 02 | 3.10E + 02 |
| 189 | −9.00E + 00 | 1.82E + 02 |
| 190 | 5.00E + 01 | −6.58E + 02 |
| 191 | −4.69E + 02 | −7.30E + 01 |
| 192 | −7.19E + 02 | −2.78E + 02 |
| 193 | 2.15E + 02 | −1.42E + 02 |
| 194 | −3.67E + 02 | 2.20E + 01 |

TABLE I-continued

| Coefficient Number | Left Channel FIR | Right Channel FIR |
|---|---|---|
| 195 | −3.64E + 02 | 2.01E + 02 |
| 196 | 5.97E + 02 | −2.88E + 02 |
| 197 | 2.51E + 02 | −1.16E + 02 |
| 198 | −3.34E + 02 | −1.41E + 02 |
| 199 | −5.80E + 01 | 2.22E + 02 |
| 200 | 1.34E + 03 | 4.24E + 02 |
| 201 | 1.15E + 03 | 1.91E + 02 |
| 202 | 2.79E + 02 | −1.32E + 02 |
| 203 | −2.30E + 01 | 3.02E + 02 |
| 204 | −7.49E + 02 | 2.28E + 02 |
| 205 | −1.80E + 02 | 4.25E + 02 |
| 206 | −2.85E + 02 | −3.70E + 01 |
| 207 | −7.66E + 02 | −1.54E + 03 |
| 208 | 6.18E + 02 | 1.05E + 03 |
| 209 | 2.06E + 02 | 4.26E + 02 |
| 210 | −2.50E + 01 | 7.50E + 01 |
| 211 | 3.02E + 02 | 3.29E + 02 |
| 212 | 1.04E + 02 | −2.01E + 02 |
| 213 | 1.39E + 02 | 1.68E + 02 |
| 214 | −3.72E + 02 | −7.47E + 02 |
| 215 | −2.00E + 02 | 9.40E + 01 |
| 216 | −5.14E + 02 | −2.13E + 02 |
| 217 | −3.63E + 02 | −1.63E + 02 |
| 218 | 3.68E + 02 | 1.98E + 02 |
| 219 | 1.06E + 02 | −1.07E + 02 |
| 220 | 1.10E + 01 | 3.51E + 02 |
| 221 | −5.25E + 02 | 2.68E + 02 |
| 222 | −3.67E + 02 | 1.50E + 02 |
| 223 | 3.25E + 02 | −1.77E + 02 |
| 224 | 9.30E + 02 | 1.60E + 01 |
| 225 | 3.33E + 02 | 2.37E + 02 |
| 226 | 2.83E + 02 | −3.11E + 02 |
| 227 | 2.56E + 02 | −7.10E + 01 |
| 228 | −4.01E + 02 | −5.70E + 01 |
| 229 | −6.59E + 02 | −3.02E + 02 |
| 230 | −5.28E + 02 | 2.08E + 02 |
| 231 | 4.93E + 02 | 4.41E + 02 |
| 232 | −3.52E + 02 | 2.75E + 02 |
| 233 | 1.71E + 02 | −1.12E + 02 |
| 234 | 5.60E + 02 | −4.33E + 02 |
| 235 | 3.01E + 02 | 9.50E + 01 |
| 236 | 3.41E + 02 | 4.40E + 02 |
| 237 | −1.89E + 02 | 3.59E + 02 |
| 238 | −8.29E + 02 | −1.27E + 02 |
| 239 | −4.90E + 02 | −1.69E + 02 |
| 240 | 2.51E + 02 | −1.06E + 02 |
| 241 | 7.86E + 02 | −9.00E + 01 |
| 242 | 8.01E + 02 | −3.33E + 02 |
| 243 | −7.70E + 01 | −6.51E + 02 |
| 244 | −3.99E + 02 | 3.77E + 02 |
| 245 | −7.45E + 02 | 8.24E + 02 |
| 246 | 2.61E + 02 | 6.09E + 02 |
| 247 | −1.13E + 02 | 2.04E + 02 |
| 248 | 1.42E + 02 | −3.51E + 02 |
| 249 | 7.01E + 02 | −6.65E + 02 |
| 250 | 5.39E + 02 | 1.00E + 01 |
| 251 | −6.90E + 01 | 1.14E + 02 |
| 252 | −1.02E + 03 | −2.24E + 02 |
| 253 | −5.24E + 02 | 5.06E + 02 |
| 254 | −1.20E + 01 | 6.21E + 02 |
| 255 | 6.41E + 02 | 2.95E + 02 |
| 256 | 3.75E + 02 | −2.45E + 02 |
| 257 | 1.68E + 02 | −3.81E + 02 |
| 258 | 3.40E + 01 | 1.39E + 02 |
| 259 | 9.00E + 00 | −1.07E + 02 |
| 260 | 2.76E + 02 | 8.40E + 01 |
| 261 | 1.73E + 02 | −8.20E + 01 |
| 262 | 1.81E + 02 | 2.43E + 02 |
| 263 | 1.32E + 02 | 1.39E + 02 |
| 264 | −2.29E + 02 | −3.26E + 02 |
| 265 | −2.22E + 02 | 2.98E + 02 |
| 266 | 7.20E + 01 | −4.19E + 02 |
| 267 | 6.39E + 02 | −3.33E + 02 |
| 268 | −4.40E + 02 | −2.04E + 02 |
| 269 | −9.76E + 02 | 3.64E + 02 |
| 270 | 4.21E + 02 | 1.91E + 02 |
| 271 | −1.46E + 02 | −8.30E + 01 |
| 272 | −5.00E + 00 | 2.99E + 02 |
| 273 | 3.53E + 02 | −2.00E + 01 |
| 274 | −1.67E + 02 | −1.08E + 02 |
| 275 | 3.60E + 01 | 2.54E + 02 |
| 276 | 1.50E + 01 | 1.09E + 02 |
| 277 | 4.20E + 01 | 1.42E + 02 |
| 278 | 7.60E + 01 | 6.16E + 02 |
| 279 | −1.88E + 02 | −3.58E + 02 |
| 280 | −3.67E + 0-2 | −4.43E + 02 |
| 281 | 1.30E + 02 | −2.81E + 02 |
| 282 | 5.42E + 02 | 1.91E + 02 |
| 283 | 2.51E + 02 | −2.61E + 02 |
| 284 | −3.20E + 01 | 1.32E + 02 |
| 285 | 4.07E + 02 | 3.95E + 02 |
| 286 | 6.15E + 02 | 2.48E + 02 |
| 287 | −3.99E + 02 | −8.40E + 01 |
| 288 | 4.30E + 02 | −5.40E + 02 |
| 289 | −2.42E + 02 | 1.24E + 02 |
| 290 | −3.54E + 02 | 3.20E + 01 |
| 291 | −1.79E + 02 | 3.81E + 02 |
| 292 | 5.20E + 01 | −5.89E + 02 |
| 293 | 5.16E + 02 | 4.90E + 01 |
| 294 | 1.50E + 01 | 6.70E + 01 |
| 295 | 9.10E + 01 | −2.31E + 02 |
| 296 | 3.02E + 02 | 3.12E + 02 |
| 297 | −1.28E + 02 | −9.20E + 01 |
| 298 | −3.87E + 02 | 2.42E + 02 |
| 299 | 1.70E + 01 | −1.24E + 02 |
| 300 | 2.83E + 02 | 2.15E + 02 |
| 301 | 3.76E + 02 | 4.29E + 02 |
| 302 | 4.52E + 02 | −1.76E + 02 |
| 303 | −3.15E + 02 | 8.00E + 01 |
| 304 | −3.87E + 02 | 1.23E + 02 |
| 305 | −2.77E + 02 | −1.63E + 02 |
| 306 | −3.07E + 02 | −1.39E + 02 |
| 307 | −4.70E + 01 | −1.37E + 02 |
| 308 | 3.24E + 02 | −1.08E + 02 |
| 309 | 6.00E + 00 | −1.50E + 01 |
| 310 | −2.30E + 02 | −6.50E + 01 |
| 311 | −2.17E + 02 | −9.30E + 01 |
| 312 | 1.40E + 02 | 2.65E + 02 |
| 313 | 3.99E + 02 | 3.80E + 01 |
| 314 | −3.60E + 01 | 4.28E + 02 |
| 315 | 1.19E + 02 | 2.00E + 01 |
| 316 | −6.60E + 01 | −2.83E + 02 |
| 317 | 2.19E + 02 | 4.55E + 02 |
| 318 | 1.36E + 02 | −1.09E + 02 |
| 319 | −5.30E + 01 | 2.32E + 02 |
| 320 | 4.10E + 01 | 5.54E + 02 |
| 321 | −1.62E + 02 | 1.20E + 01 |
| 322 | −1.30E + 01 | −3.64E + 02 |
| 323 | −4.40E + 01 | −2.88E + 02 |
| 324 | 4.22E + 02 | −6.90E + 01 |
| 325 | 2.91E + 02 | −1.31E + 02 |
| 326 | −8.00E + 00 | 2.31E + 02 |
| 327 | 1.91E + 02 | 2.61E + 02 |
| 328 | −2.02E + 02 | −2.25E + 02 |
| 329 | −5.55E + 02 | −6.60E + 01 |
| 330 | −1.87E + 02 | 2.63E + 02 |
| 331 | −4.36E + 02 | 2.30E + 01 |
| 332 | 2.80E + 01 | −3.43E + 02 |
| 333 | 2.44E + 02 | −3.34E + 02 |
| 334 | −1.66E + 02 | −1.72E + 02 |
| 335 | −1.00E + 01 | −2.80E + 01 |
| 336 | −3.75E + 02 | 2.19E + 02 |
| 337 | 1.78E + 02 | 5.30E + 01 |
| 338 | −1.47E + 02 | 1.21E + 02 |
| 339 | 1.81E + 02 | −6.20E + 01 |
| 340 | 1.55E + 02 | −1.68E + 02 |
| 341 | 9.30E + 01 | 2.08E + 02 |
| 342 | 7.50E + 01 | 3.10E + 02 |
| 343 | −1.59E + 02 | 6.50E + 01 |
| 344 | 6.55E + 02 | 2.91E + 02 |
| 345 | 7.37E + 02 | −5.50E + 01 |
| 346 | 7.30E + 02 | −2.70E + 01 |
| 347 | 6.60E + 01 | 1.70E + 01 |
| 348 | −1.32E + 02 | 3.14E + 02 |

TABLE I-continued

| Coefficient Number | Left Channel FIR | Right Channel FIR |
|---|---|---|
| 349 | −3.79E + 02 | 1.28E + 02 |
| 350 | 6.10E + 01 | 0.00E + 00 |
| 351 | −5.00E + 01 | 2.30E + 01 |
| 352 | −5.00E + 01 | −6.00E + 01 |
| 353 | 0.00E + 00 | 6.00E + 00 |
| 354 | −3.17E + 02 | −2.02E + 02 |
| 355 | −7.80E + 01 | −3.43E + 02 |
| 356 | 1.60E + 01 | −5.65E + 02 |
| 357 | 3.60E + 01 | −1.26E + 02 |
| 358 | 4.51E + 02 | 4.61E + 02 |
| 359 | 4.93E + 02 | 7.49E + 02 |
| 360 | −4.91E + 02 | 2.98E + 02 |
| 361 | −1.15E + 02 | −1.00E + 02 |
| 362 | 2.25E + 02 | −1.23E + 02 |
| 363 | 3.00E + 01 | −3.42E + 02 |
| 364 | −5.52E + 02 | 2.59E + 02 |
| 365 | 1.44E + 02 | −1.72E + 02 |
| 366 | 4.29E + 02 | 4.00E + 00 |
| 367 | 1.69E + 02 | 2.68E + 02 |
| 368 | 6.80E + 01 | 2.94E + 02 |
| 369 | −3.02E + 02 | 1.67E + 02 |
| 370 | −5.60E + 01 | −1.73E + 02 |
| 371 | −3.80E + 01 | −4.51E + 02 |
| 372 | −2.94E + 02 | −1.64E + 02 |
| 373 | −1.27E + 02 | 3.87E + 02 |
| 374 | 4.05E + 02 | −1.71E + 02 |
| 375 | −4.20E + 01 | −7.70E + 01 |
| 376 | 2.63E + 02 | 2.16E + 02 |
| 377 | 3.01E + 02 | 4.10E + 01 |
| 378 | 6.00E + 00 | −1.49E + 02 |
| 379 | −2.24E + 02 | 2.73E + 02 |
| 380 | −3.90E + 01 | 1.92E + 02 |
| 381 | 4.39E + 02 | 4.20E + 01 |
| 382 | 9.50E + 01 | −2.87E + 02 |
| 383 | −1.62E + 02 | 2.08E + 02 |
| 384 | 2.71E + 02 | 3.68E + 02 |
| 385 | 7.60E + 01 | −1.90E + 02 |
| 386 | −3.27E + 02 | 2.26E + 02 |
| 387 | 4.27E + 02 | −8.60E + 01 |
| 388 | 1.70E + 02 | −1.64E + 02 |
| 389 | −5.83E + 02 | 1.81E + 02 |
| 390 | −6.22E + 02 | 1.20E + 01 |
| 391 | 1.09E + 02 | −4.70E + 01 |
| 392 | 6.30E + 02 | −5.00E + 00 |
| 393 | 1.53E + 02 | −1.37E + 02 |
| 394 | 3.70E + 01 | −8.00E + 00 |
| 395 | −7.50E + 01 | −3.40E + 02 |
| 396 | −4.95E + 02 | −2.44E + 02 |
| 397 | −2.13E + 02 | 1.06E + 02 |
| 398 | −2.80E + 01 | −6.90E + 01 |
| 399 | 4.86E + 02 | 1.65E + 02 |
| 400 | 0.00E + 00 | 0.00E + 00 |

What is claimed is:

1. A telephone instrument for receiving signals from and for transmitting signals to a telephony apparatus via a telephone line, the telephone instrument comprising:

transmitter means;

a pair of receiver means for use in acoustical association with left and right ears of a user of the telephone instrument;

signal coupling means including signal transmitting means and signal receiving means, the signal transmitting means transmitting signals from the transmitter means to the telephone line, the signal receiving means receiving signals from the telephone line to provide received signals $X(i)$;

a pair of received signal processing means, each for processing the received signals $X(i)$, each received signal processing means including direct path processing means, finite impulse processing means, all-pass signal means and signal summing means;

the direct path processing means for processing the received signals $X(i)$ and providing a direct path output signal which is proportional to the received signals $X(i)$;

the finite impulse processing means for processing the received signals $X(i)$ and providing a finite impulse output signal which is proportional to $\Sigma C(k) \cdot X(i-k)$;

the all-pass signal means for processing the finite impulse output signal and providing an all-pass output signal which is proportional to $\beta(i-M)$;

where $\beta(i)=(-g)\cdot X(i)+(1-g^2)\, \alpha(i-N)$, and $\alpha(i)=X(i)+g\cdot\alpha(i-N)$, wherein, $C(k)$ represents a sequence of finite impulse response coefficients, g is a gain coefficient, and M and N represent delay coefficients;

the signal summing means summing the direct path output signal, the finite impulse output signal and the all-pass output signal and providing a summed signal for operation of the respective one of the pair of receiver means; and the coefficients in one of the pair of received signal processing means being different from those of the other received signal processing means, whereby an audible phase characteristic of the summed signal provided by each received signal processing means is altered from the received signals $X(i)$, so that signals audible at one of the pair of the receiver means are at variance with signals audible at the other of the pair of the receiver means.

* * * * *